United States Patent [19]

Smarook

[11] 3,919,378
[45] Nov. 11, 1975

[54] BRISTLED ARTICLE AND PROCESS
[75] Inventor: Walter H. Smarook, Somerville, N.J.
[73] Assignee: Union Carbide Corporation, New York, N.Y.
[22] Filed: Dec. 26, 1973
[21] Appl. No.: 427,472

Related U.S. Application Data
[63] Continuation-in-part of Ser. No. 213,479, Dec. 29, 1971, abandoned.

[52] U.S. Cl. ............... 264/164; 161/116; 264/235; 264/243; 264/293; 264/346; 264/DIG. 78
[51] Int. Cl.² ...................... B29D 5/00; B29C 17/02
[58] Field of Search .......... 264/164, 167, 284, 293, 264/280, 243, 89, 90, 346, 101, 235, DIG. 78; 161/116

[56] References Cited
UNITED STATES PATENTS

| | | | |
|---|---|---|---|
| 2,233,570 | 3/1941 | Absmeier | 264/320 |
| 2,502,304 | 3/1950 | Baker | 264/164 |
| 3,367,760 | 2/1968 | Bendig et al. | 65/54 |
| 3,399,425 | 9/1968 | Lemelson | 264/280 |
| 3,450,585 | 6/1969 | Takagi et al. | 264/164 |
| 3,708,565 | 1/1973 | Seiffert | 264/167 |

FOREIGN PATENTS OR APPLICATIONS 1,015,330  12/1965  United Kingdom................ 264/164

Primary Examiner—Jerry R. Thurlow
Attorney, Agent, or Firm—J. J. O'Connell

[57] ABSTRACT

A bristled article is integrally formed in an essentially one step low pressure process from a sheet of thermoformable material between a top and bottom mold surface. The bottom mold surface is smooth and the top mold surface is channeled, and the sheet, in a fused state, is pulled between the mold plates and while bonded thereto by hot tack adhesion, and bristles form at the points of contact with the top mold surface.

The bristled articles are useful as brush devices, artificial turf, packaging material and the like.

11 Claims, 12 Drawing Figures

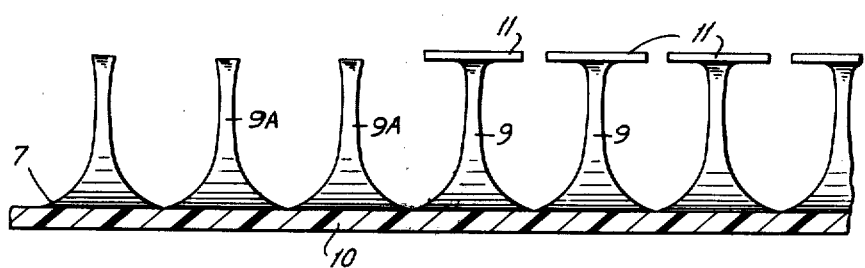
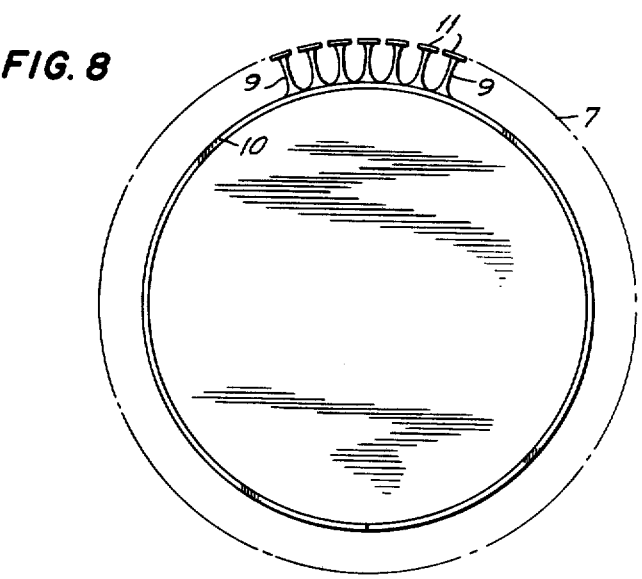

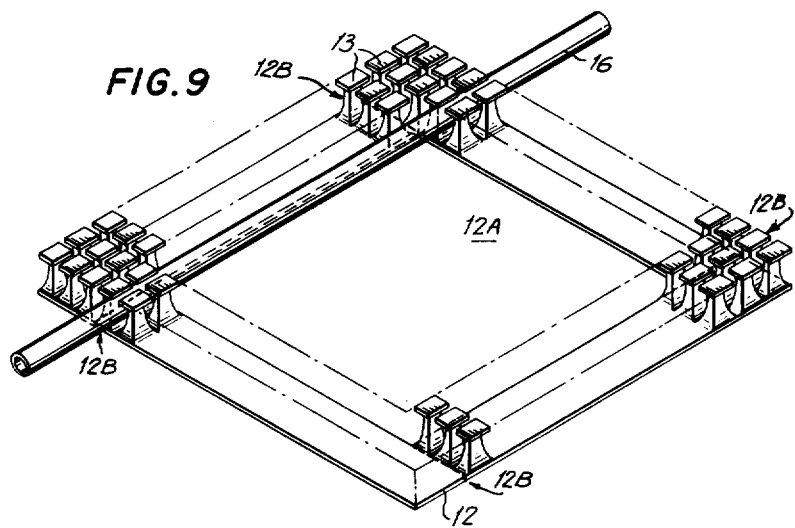
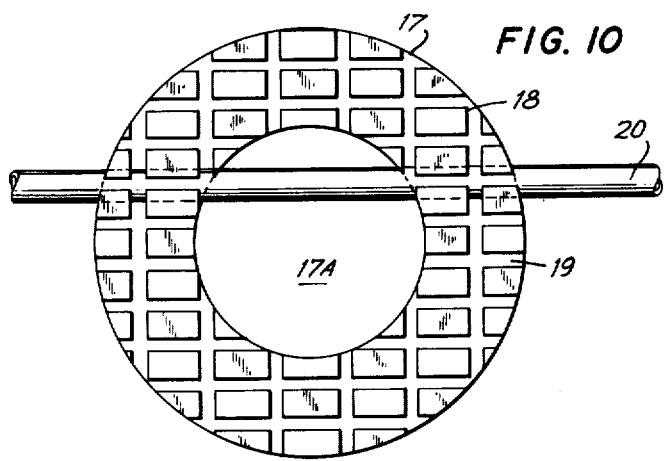

BRISTLED ARTICLE AND PROCESS

CROSS REFERENCES TO RELATED PATENT APPLICATIONS

This patent application is a continuation-in-part of patent application Ser. No. 213,479 filed Dec. 29, 1971, now abandoned.

BACKGROUND OF THE INVENTION

1. Field of the Invention

This invention relates to the art of forming or shaping end-use objects from thermoformable materials.

2. Description of the Prior Art

Bristled articles such as brushes, artificial turf, belt surfaces having bristle-like configurations, and the like are common articles of commerce. Such articles usually comprise, structurally, a backing member which supports the bristle members, and from which the bristle members project vertically. In the manufacture of such bristled articles the bristle members and the backing members are usually each manufactured in a separate operation, and then the bristle members are affixed to the backing member in an additional operation. The bristled members may be affixed to the backing members in various ways, such as with adhesives, stapling means, or by a weaving type operation. In most cases, the bristle element is also made of a different material than that used for making the backing material. Thus, the need for using these different materials of construction, and the need for a plurality of fabricating operations, greatly increases the cost of the resulting product, and severely complicates the manufacturing process.

In some cases, plastic brushes can be injection molded in one operation so that the bristles and the holder are made of the same material. This procedure, however, requires the use of resins having relatively low melt indexes, expensive molds and a high pressure injection molding process.

SUMMARY OF THE INVENTION

Bristled articles are made from thermoformable material in a relatively facile manner by pulling a sheet of thermoformable material, while it is in a fused state, between a top and bottom mold plate; the top mold plate having a pattern of channels in the face thereof, and the bottom mold plate being smooth surfaced. A backing member for the bristled article results at the interface between the sheet of plastic and the bottom mold plate, and bristle elements projecting vertically from such backing member result at the interface between the sheet of plastic and the top mold plate.

An object of the present invention is to provide integrally formed bristled articles made from thermoformable materials.

Another object of the present invention is to provide an essentially one step, low pressure, process wherein bristled articles may be readily formed integrally from thermoformable materials, using assembly line techniques, and without the use of adhesives.

DEFINITIONS

With respect to the herein provided description, examples and claims relating to the present invention the following definitions apply:

"Thermoformable" means that the thereby described material is a solid at 25°C. Which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means the temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C. The Ta values reported herein were specifically determined with respect to the adhesion of the polymeric material to an aluminum substrate. Essentially the same Ta value will be obtained upon adhering the polymers to other substrates.

|    | Polymer | Tg | Tm | Ta |
| --- | --- | --- | --- | --- |
| 1. | polyethylene Density= 0.96 M.I.= 3-5 | — | 126 | 135-140 |
| 2. | polyethylene Density= 0.94 M.I.= 12-15 | — | 122 | 130-135 |
| 3. | polyethylene Density=0.924 M.I.=1.2 | — | 100-108 | 120 |
| 4. | polyvinyl chloride | >5 | — | 155 |
| 5. | Nylon-6 | 60 | 215-220 | 240 |
| 6. | Nylon-6,6 | 65 | 260 | 270 |
| 7. | Polycaprolactone | — | 58 | 60 |
| 8. | Polyurethane (polyester) | — | 130-170 | 160-180 |
| 9. | Polysulfone | 185 | — | 300 |
| 10. | polypropylene | −5 to 0 | 165-170 | 170 |
| 11. | polycarbonate | 150 | — | 225 |
| 12. | polymethylmethacrylate | 90 | — | 160 |
| 13. | polystyrene | 100 | — | 185 |
| 14. | polystyrene (impact grade) | 100 | — | 180 |
| 15. | polyacetal | −60 | 165 | 170 |
| 16. | 90/10 mol % copolymer of polymethacrylo-nitrile & styrene | 115 | — | 240 |
| 17. | 70/30 mol % copolymer of polyvinyl alcohol and polyvinyl acetate | 50-60 | — | 120-130 |
| 18. | 94.2/5.7 mol % copoly-mer of ethylene and ethyl acrylate | −20 | — | 110 |
| 19. | 91.8/8.2 mol % copoly-mer of ethylene and acrylic acid | 18 | — | 110 |
| 20. | 82/18 wt. % copolymer of ethylene and vinyl acetate M.I.=2.3 | −15 | — | 120 |
| 21. | styrene-butadiene copolymer | 90 | — | 190 |
| 22. | styrene-acrylonitrile copolymer | 100 | — | 190 |
| 23. | hydroxy propyl cellulose | 100 | — | 110 |
| 24. | (solution blend of) polystyrene and polyphenylene oxide | 115-120 | — | 235 |
| 25. | cellulose acetate | 120 | — | 170 |
| 26. | acrylonitrile-buta-diene-styrene terpolymer | 98 | — | 180 |

It has now been found that a bristled article may be readily formed by expanding the cross-section of a sheet of thermoformable material between a pair of separable mold plates, one being a top mold plate having a pattern of channels or grooves in the face thereof, and the other being a continuous faced bottom plate. The expansion of the sheet is conducted while the sheet is heated so as to place the thermoformable material in a thermoformable state, i.e., the sheet is heated to a temperature which is ≥ the fusion point of the thermoformable material. The mold plates are moved apart to effect the desired expansion of the sheet of thermoformable material into the form of a bristled article, while the sheet is attached to the surfaces of the mold plates as disclosed below.

BRIEF DESCRIPTION OF THE DRAWINGS

FIGS. 6 and 7 show cross-sectional views, of a bristled article made with a top mold plate as shown in FIG. 1 and a continuous faced bottom mold plate.

FIG. 8 shows a cross-sectional view of a bristled article used as a cushioning device.

FIGS. 9 to 11 show the use of expanded articles of the present invention as racks or cradles.

FIG. 12 shows the use of expanded articles of the present invention as a zipper-like device.

Figure 1:
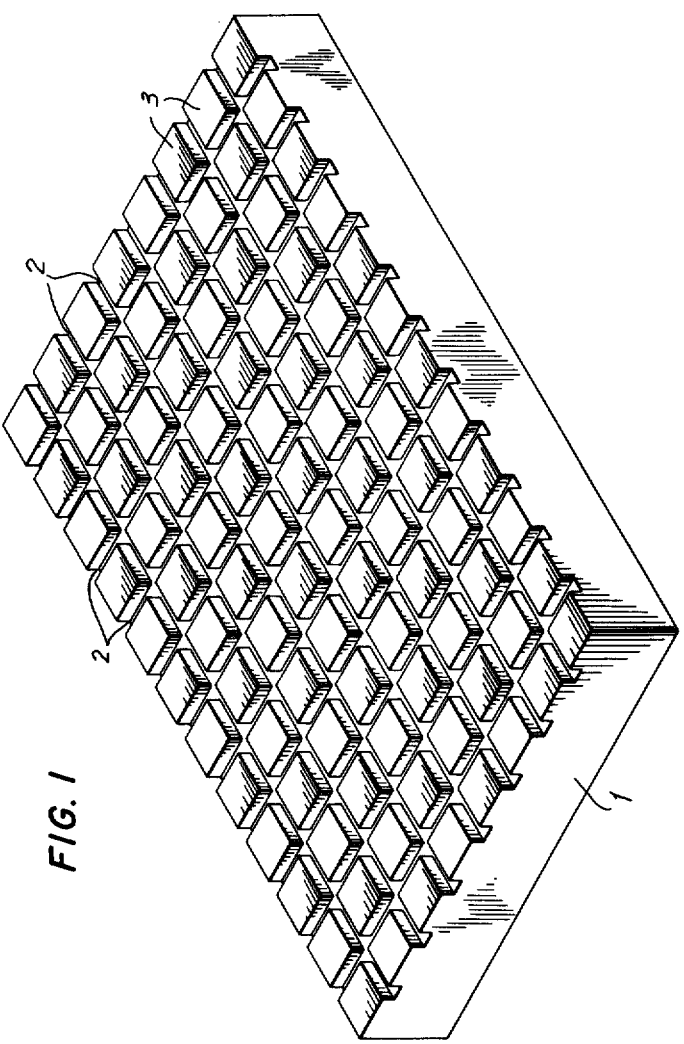
FIG. 1 shows, in perspective, a top mold plate which may be used in the process of the present invention.

The preferred embodiment of the process of the present invention is based upon the property of various materials, and particularly thermoplastic polymeric materials, to exhibit hot-tack adhesion to practically all substrates at a temperature, Ta, which is usually above the Tg or Tm of the thermoplastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its Tm or Tg.

Thus, if a blank of thermoplastic polymeric material is placed between two mold plates of a heated press so that the temperature of the mold plate is about Ta or 5° to 10°C. above the Ta of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surface and the fused material.

Although the mass of the expanded fusible material does not change, the cross-sectional configuration of the fusible material is expanded in the direction of the two separated plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occurring. The strength of the bond will thus depend on the nature of the thermoplastic resin in the blank, the nature of the mold plate materials, the extend of the surface area of the mold plate which is in contact with the fused blank and the cohesive strength and flow properties of the polymeric plastic.

Thus, the use as mold surfaces, of materials which are more readily wet by the fused plastic blank, will allow for a wider separation of the mold surfaces with the fused plastic bonded thereto, than would the use of mold surfaces made from materials which are not as readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanding plastic. Thus, although the mass of plastic does not change, the volume of the expanding cross-section of the plastic does increase. The frequency of the occurrence of these voids, as well as their size and shape, i.e., the pattern of the voids, is largely determined by the pattern of the points or areas of contact which exist between the mold surfaces and the expanding plastic during the expansion process. In order to maintain the desired pattern of the voids, it is necessary to vent the voids during the expansion step so as to equilibrate the pressure within the voids with the pressure without the expanding material.

The pattern of the points or areas of contact between the mold surfaces and the thermoplastic blank can be readily varied.

For the purposes of the present invention the means for providing such pattern of contact can be generally characterized as channel means and such channel means are used to provide a pattern of interconnected channels at the interface between the top surface of the blank and the blank contact surface of the top plate when the blank is inserted in the press between the top plate and the bottom plate. In the preferred mode of operation of the process of the present invention the pattern of the areas of contact between the surfaces of the mold plates is preferably provided by using, as the bottom plate, a continuous faced plate, and, by using as the top plate, a plate having a pattern of interconnected recessed channels or grooves therein as the channel means. The bottom plate will thus provide continuous contact with the entire surface of the sheet facing such bottom plate. The channeled top plate will only provide contact with the surface of the sheet facing such top plate at the non-channeled areas of such top plate.

The desired pattern of contact areas can also be supplied to the contact surfaces of the top mold plate or the sheet with other channel means. A negative of the desired pattern can be used as such other channel means and it can be affixed to the contact surface of the sheet which is to contact the top mold plate or affixed to the contact surface of the top mold plate itself, in the form of masking means, such as cut-outs in the form of a grid of masking tape, kraft paper, "Mylar film" or other materials which will prevent the fused thermoplastic material from adhering to the surface of the top mold plate. Thus, the fused plastic will only be allowed to adhere to the surface of the top mold plate at those areas of contact between the surface of the top mold plate and the sheet where there is no masking means present.

These "negatives" thus function, when used as channel means in the process of the present invention, in a manner of procedure which is directly opposite to that of the channeled top mold plates, the use of which as channel means is discussed above. These "negative" channel means thus prevent contact at the interface between the top surface of the blank and the contact surface of the top mold plate at those places at the interface where such "negative" channel means are present. The use of the channeled top mold plates, on the other hand, provides a lack of contact at such interface where the blank contact surface of the top mold plate is not present, i.e., at the areas of the interface of the channels or grooves in the top mold plate. Each of these two types of channel or groove means, does, however, function in the same basic manner, that is, each provides a pattern of interconnected channels in the interface between the contact surface of the top mold plate and the top surface of the blank.

Thus, it may be said that the cross-sectional geometry of the expanded sheet is a function of the design of the areas of contact which is provided in the contact surface of the top mold plates or the surface of the blank which is to contact the top mold plate. It is such design which determines the extent to which the surface areas of the top mold plate and the blank are kept in contact during the expansion step in the process, and the extent of such contact areas is what determines the pattern of the voids or channels in the expanding blank or sheet, and thus, in the cross-sectional geometry of the resulting bristled article.

The voids or channels created in the sheet during the expansion step are vented through the channels or grooves in the top mold plate, or in the case of the use of a negative perforation means, the voids or cells are vented from the outside of the blank and between the negative and the mold plate. Venting of the negative perforation means may also be accomplished by providing a vent hole over the negative perforation means which vent hole would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of a sheet having thicknesses of the order of about 40 to 300 mils, such blanks may be expanded $\geq$ 2 to 20 times such thicknesses according to the present invention by expanding the fused blank at a rate of separation of the mold plates of about 10 to 150 mils per second.

After a desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expanded blank is cooled to a temperature below its heat distortion point, before being removed from the press so as to freeze, so to speak, the configuration of the expanded blank, and thus prevent distortion of such configuration.

Thus in the preferred embodiment of the process of the present invention the cross-section of the blank of thermoformable material having a Ta is expanded between a pair of mold plates so as to provide an integrally formed bristled article in the following sequence of steps:

The blank, in the form of a continuous or non-continuous sheet having a top surface and a bottom surface, is inserted between a top mold plate and a bottom mold plate, with each of the plates having a surface for contacting the blank, and each of the plates having a fusion point which is higher than the Ta of such thermoformable material, the blank contacting surface of the bottom mold plate being continuous, and channel means being used to provide a pattern of interconnected channels at the interface between the top surface of the blank and the blank contact surface of the top mold plate, such pattern providing areas of contact and non-contact between the top surface of the blank and the blank contact surface of the top mold plate, the blank is bonded by hot tack adhesion to the sheet contacting surfaces of the mold plates, the mold plates are pulled apart, while the blank is thus adhesively bonded thereto so as to draw a portion of the thermoformable material from the blank in the form of a plurality of discrete bristle elements, the pattern of occurrence of such bristle elements being determined by the pattern of areas of contact between the top mold plate and the blank, the pulling apart of the blank effecting reduced pressure conditions within the channels, venting the channels during such pulling apart so as to equilibrate the pressure within the channels with the pressure without the channels so as to thereby regulate the uniformity and integrity of the configuration of the bristles, cooling the resulting expanded blank to a temperature below the heat distortion temperature of the thermoformable material, and separating the cooled expanded blank from the mold plates.

The mold plates which are to be used may be disengageable from the device used to move them apart during the expansion step of the process described above. One or both of the mold plates can also be more permanently affixed to such device, in which case, the cooled, expanded thermoformable material is then removed from the device and the mold plate(s) affixed thereto.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can be mechanically stripped from the mold plates without disrupting the integrity or configurations of the expanded blank.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the process of the present invention can be obtained from the process sequences illustrated in FIGS. 1 to 4 of the drawings.

FIG. 1 shows a perspective view of a top mold plate 1 which resembles the face of a waffle iron and may be used in the process of the present invention. Mold plate 1 has a series of interconnected recessed channels or grooves 2 cut into the top of such plate. Elevated areas 3 at the top surface of mold plate 1 are defined by the grid-like pattern of channels 2, and elevated areas 3 serve as the blank contact surface of mold plate 1. Channels 2 serve as the channel means. The channel means need not be used in a grid pattern. The channel means can be a series of parallel channels or grooves running in one direction across the face of mold plate 1. In the top mold plate 1 shown in FIG. 1 contact surfaces 3 comprise a series of aligned rows and columns of rectangles, with each rectangle being separated from the others by recessed channels or grooves 2 that run the length and width of the top surface of mold plate 1.

Figure 2:
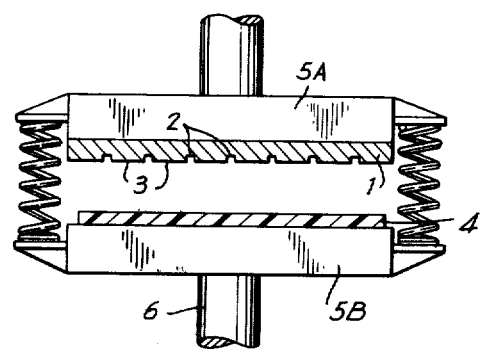
FIGS. 2 to 4 show a sequence of steps involved in forming a bristled article from a sheet of thermoformable material according to one embodiment of the present invention, using a mold plate as shown in FIG. 1 as a top mold plate.
Figure 3:
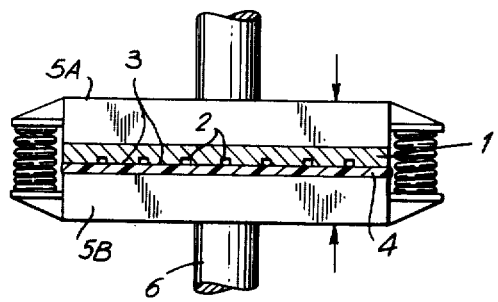
Figure 4:
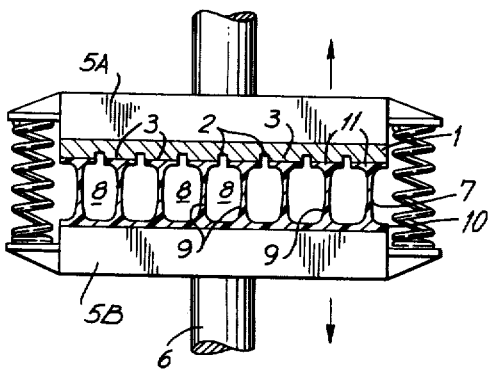

FIGS. 2 to 4 show a sequence of steps involved in using top mold plate 1 according to one modification of the process of the present invention. In FIG. 2 there is shown a blank 4 of thermoformable material having a Ta, in the form of a smooth surfaced sheet of such material, which is inserted between the open platens, 5A and 5B, of a Carver press. To the face of upper platen 5A of the press there is attached a top mold plate 1 with the face having contact areas 3 therein facing down. In the embodiment shown, the continuous upper surface of lower platen 5B functions as the bottom mold plate contact surface which will contact the lower contact surface of the blank 4 during the expansion process. Top mold plate 1 and platens 5A and 5B are heated, for the purposes of the present invention, to a temperature which is about Ta or 5° to 10°C. above the Ta of the blank 4. Top mold plate 1 and the platens 5A and 5B may be heated before, preferably, or after the blank is inserted in the press. Top mold plate 1 is preferably heated conductively through platen 5A.

The Carver press described herein is a 20 ton hand operated hydraulic ram 6 which actuates a movable lower platen 5B against a fixed upper platen 5A. In other presses, the upper mold platen can be movable with the lower platen fixed, or both platens can be movable. The platens are usually heated electrically. Although the Carver press is the preferred means for bringing the heated mold plates and platens into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 3, shows the press after it has been closed with sufficient pressure to cause the top mold plate 1 and bottom mold platen 5B to exert a slight pressure on blank 4 so as to cause the heated blank to wet the contact surfaces 3 of top mold plate 1 and bottom mold platen 5B which come in contact with the blank. The amount of pressure required for this step is of the order of about 1 ounce to 4 pounds per square inch. The pressure causes the blank to be slightly compressed.

FIG. 4 shows the platens pulled apart after the expansion step, with the expanded blank 7 adhering to points or areas of contact with plate 1, at areas 3 thereof, and platen 5B.

During the expansion step, as will be discussed in more detail below, areas of reduced pressure or voids 8 arise within the cross-section of the expanding blank 7. The side walls of the individual voids 8 are defined by rib-members or strands 9 of the expanded blank. The limits of voids 8 are defined by the contact surface 3 of top mold plate 1, side walls 9 and base member 10 of expanded blank 7. The reduced pressure in voids 8 is caused by the fact that each void 8 tends to become a sealed chamber when the blank 4 fuses to the contact surfaces 3 of top mold plate 1 and bottom mold platen 5B, and as the mold surfaces are pulled apart, the sealed voids 8 become enlarged, thus creating areas of reduced pressure. To prevent the higher ambient pressures from distorting or rupturing expanded walls 9 of the blank 7, voids 8 of the blank 7 are vented during the expansion step so as to equilibrate the pressure within such voids 8 with the ambient pressure outside the blank 7. This venting tends to preserve the pattern and the integrity of the resulting cross-sectional geometry of the expanded blank. In this embodiment of the present invention, the venting is accomplished through the channels 2 in top mold plate 1 and the ambient atmosphere by venting these channels. to the outer edges of the mold plate.

During the molding or expansion step in the process the lower surface of the expanding blank adheres to the upper surface of platen 5B and this causes the formation of continuous base member 10 of expanded blank 7. Similarly, the upper surface of the expanding blank adheres to the contact surfaces 3 of top mold plate 1 and this causes the formation, upon expansion of the blank, of I beam shaped strand or rib members 9, each of which has a head member 11 at the top thereof, and at the lower end thereof is integrally joined to continuous base member 10.

After the mold plates have been expanded the desired distance they are cooled to a temperature which is below the heat distortion point of the plastic in the blank. The cooling may be allowed to occur in the ambient air, or by circulating a cooling medium through the platens, or in some cases by a liquid coolant spray, or by conduction through cooled platens, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. Where the bottom mold plate is to be disengagable from the rest of the press it is preferable to use a separate sheet of metal or other suitable mold plate material having a continuous blank contact surface, rather than attempt to use the lower platen of the press for this purpose as shown in FIGS. 2 to 4 above.

Figure 5:
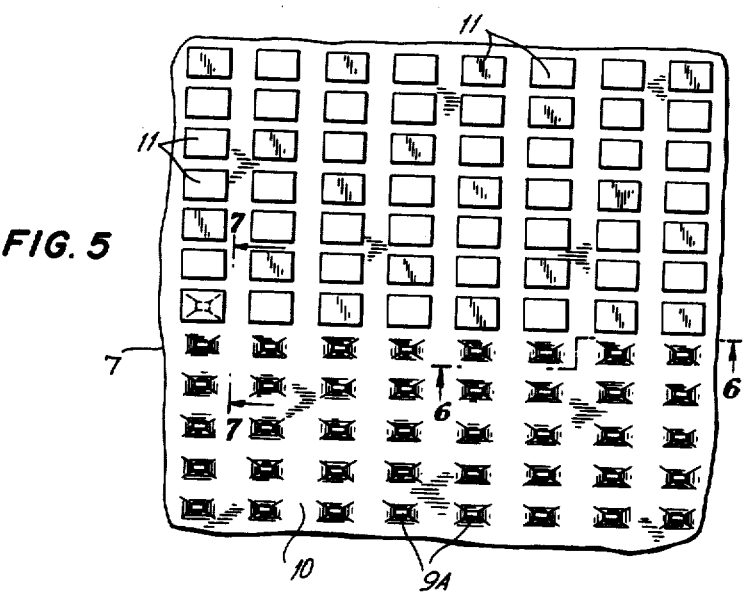
FIG. 5 shows a top view.
Figure 6:
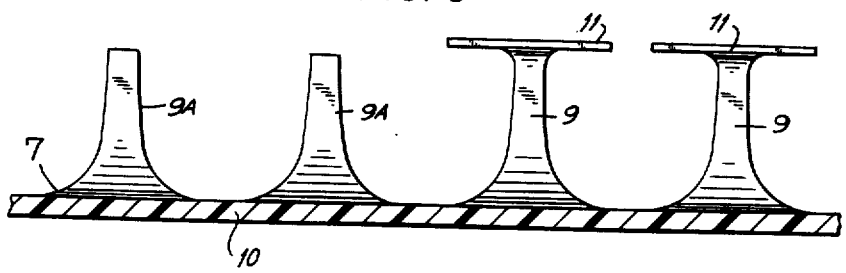

FIG. 5 shows a top view, and FIGS. 6 and 7 provide cross-sectional views, of expanded blank 7, after the expanded blank was removed from the press and subjected to a further process step as will be described below. The top view of expanded blank 7, as shown in FIG. 5, provides a partial replication of the pattern of contact surfaces 3 of the upper mold plate 1 of the press to which it adhered during the expansion step. This pattern is shown replicated in the pattern of columns and rows of rectangular shaped head members 11 depicted in the upper half of expanded blank 7 in FIG. 5. Each of these rectangles is the head 11 of an expanded I beam shaped rib member 9 as shown in cross-section in FIG. 6 and 7. The base 10 of expanded blank 7 is a continuous film of plastic which forms the base for each and every rib member 9. During the expansion step in the process, the resulting voids, in the form of voids 8 between expanding rib members 9, are vented through the ends thereof, out the sides of the expanding blank.

After the expansion operation the head member 11 of some of the rib members 9 were removed so as to provide bristle like members 9A as shown in cross-section in FIGS. 6 and 7.

For aesthetic, or other purposes, it may be desired to expand the cross-section of the blank in a non-uniform manner so as to provide expanded blanks which have cross-sectional areas of various degrees of thickness. In the expanded blank 7 shown in FIGS. 5 to 8, all rib members 9 were expanded to the same uniform height. The height of these rib members is adjusted by the extent to which the blank is pulled apart during the expansion step in the process of the present invention. The blank is usually pulled apart so that the rib members are at least longer than they are wide.

The bristled article thus formed in an integral manner, i.e., from a single compound or composition and in an essentially one step forming process, may be said to comprise a continuous base member, and a plurality of strand or bristle members projecting vertically from at least one side of such base member, with each of such strand members having an I beam configuration.

In the expanded blank shown in FIGS. 5 to 8 all of the strand or bristle members 9 project from the same side of base member 10, although in other embodiments bristles can be provided on both surfaces of base member 10.

The expanded blank 7 shown in FIGS. 5 to 7 can be used for the preparation of bristled objects such as artificial turf, brushes, door mats, scraping devices and packaging or cushioning material. FIG. 8, for example, shows a flexible expandable blank 7 rolled in the form of a circle with bristles 9, having heads 11 thereon, protruding outward. In this form, expanded blank 7 may be used as a cushioning or protective device for articles enclosed therein. The head members 11 can be removed from, or left on, rib members 9, for all of the applications in question.

Figures 11, 12:
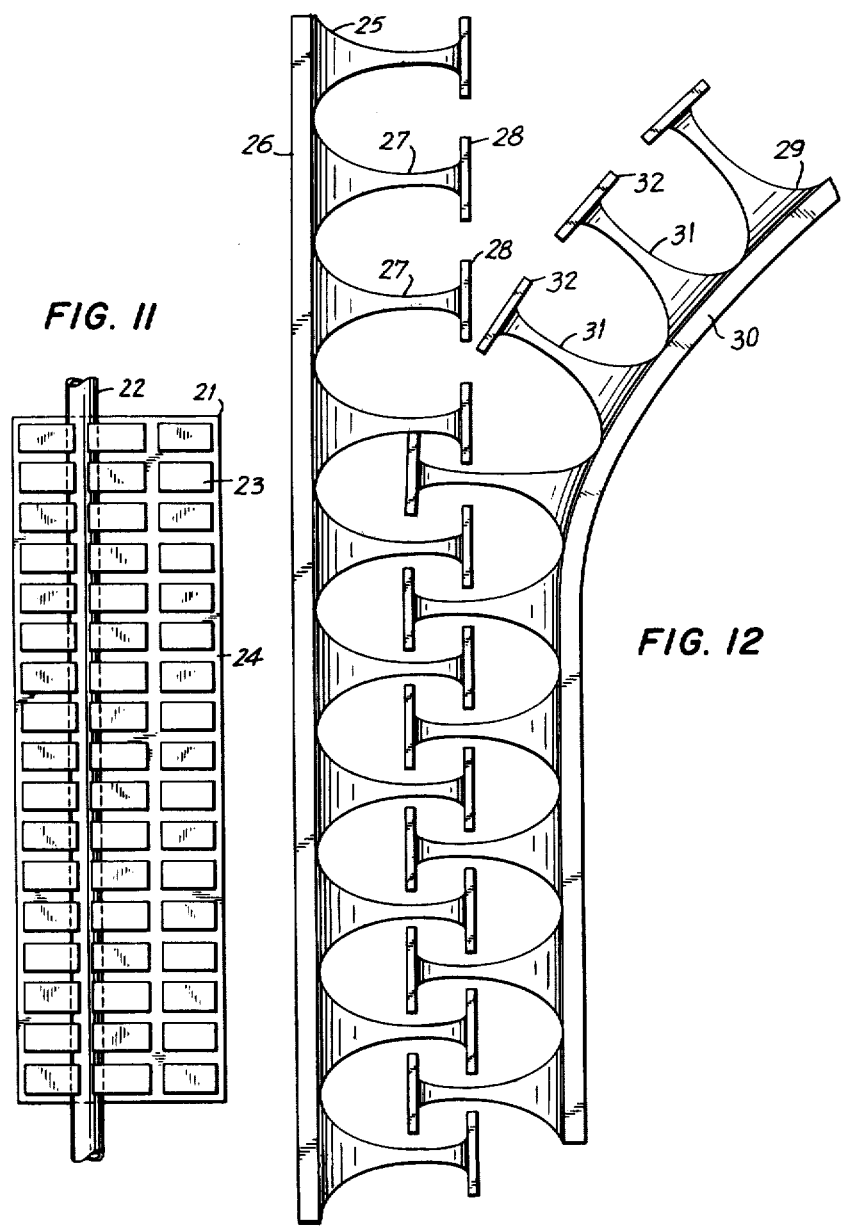

FIGS. 9 to 12 also show various types of end-use applications for which the expanded blanks of the present invention may be employed. FIGS. 9, 10, and 11, for example, show the use of expanded blanks which may be used as racks or cradles for elongated items, such as glass tubing, thermometers, test tubes, piping and the like. FIG. 9 shows, in perspective, a square or rectangular shaped expanded blank 12 which has a hollow area 12A. Four seams, 12B, shown by dotted lines or arrows, will be discussed below in Example 9. Expanded blank 12 has a plurality of I beam shaped bristle members 13 positioned in rows and columns on the four legs of its rectangular configuration. Bristle members 13 have heads 14, and all bristle members 13 project vertically from base 15 of the expanded blank. The hollow area 12A of expanded article 12 allows for a visual inspection and ready grouping of the elongated items, such as glass tubing 16, that may be racked or cradles thereon.

FIG. 10 shows, in perspective, a circular shaped expanded blank 17 which has a hollow area 17A. Expanded blank 17 has a plurality of I beam shaped bristle members 18 positioned in rows and columns around the periphery thereof. Bristle members 18 project vertically from base 19 of the expanded blank. The hollow area of 17A of expanded article 17 allows for a visual inspection and ready grouping of elongated items, such as glass tubing 20, that may be racked or cradled thereon.

Expanded articles 12 and 17 may be used as racks, and mounted on walls, for the storing or mounting of elongated items on walls. Expanded articles 12 and 17 may also be used on a flat surface, as a cradle for elongated items mounted thereon. Where used as wall mounts, it is preferable that bristle elements 13 and 18 be flexible where the objects mounted on expanded articles 12 and 17 are to be readily removed from, and returned to, such mountings. Where the elongated objects are to be more permanently mounted in expanded articles 12 and 17, on a wall, then bristle elements 13 and 18 can be rigid.

FIG. 11 shows an elongated expanded blank 21 which is used to house elongated piping or tubing 22 thereon. Expanded blank 21 has a plurality of I beam shaped bristle members 23 positioned in rows and columns thereon. Bristle members 23 project vertically from base 24 of the expanded blank. Expanded blank 21 can be used as a protective cradle for the shipment therein of elongated items such as piping, glass tubing, and the like. Bristle elements 23 can be flexible or rigid. Where bristle elements 23 are rigid, the elongated materials to be mounted therein can be inserted in, and removed from, between two rows or columns of the bristles, at the ends thereof. Where bristle elements 23 are flexible, the elongated materials which are to be mounted therein can be inserted in, and removed from, between two rows or columns of the bristles by pushing or pulling the elongated items past the flexible heads of the bristle members. The overhanging lips of the heads of bristle elements 23 provides a protective canopy over the elongated item cradled under such head members.

FIG. 12 shows the use of two different expanded articles 25 and 29 to form a zipper-like device. Expanded article 25 is a rigid article which has rigid backing member 26 and rigid bristles 27, rigid bristle heads 28 and which may be made from plastics such as polycarbonate, polymethymethacrylate, nylon-6, polystyrene, (rigid) polyvinyl chloride and polyethylene, as disclosed below in the examples. Expanded article 29 is a flexible article which has a flexible backing member 30, a flexible bristle 31, and flexible bristle heads 32. This flexible type of expanded article may be made from resins such as ethylene-ethyl acrylate copolymers and polyurethanes as disclosed below in the examples. These zipper-like devices exhibit good holding properties under lap shear loading conditions, i.e. when loads are applied parallel to the surfaces of backing members 26 and 30. These zipper-like devices, however, also allow for the ready separation of the flexible member 29 by the peeling of such member from the rigid member 25 as shown in FIG. 12. Bristle heads 28 and 32 shown in FIG. 12 are rectangular in shape.

The use of different shaped or contoured bristle heads on flexible and/or rigid articles 25 and 29 is also possible so as to provide different degrees of peel strength properties and shear load properties in the composite device. This zipper type device can be used as zipper means for packaging applications.

The expanded plastic objects made in accordance with the present invention are lightweight panels that may be rigid or flexible depending on the plastic used therein, and the degree to which the plastic is expanded. Additional rigidity may be supplied by bonding or fastening the expanded plastic member to one or more rigid lamina.

The bristles 9 were provided on expanded blank 7, as shown above, in an ordered arrangement of aligned rows and columns. Other patterns of the bristles can be provided by the use of appropriately designed contact areas in the contact surface of the top mold plate. Thus the contact areas could be designed so as to provide staggered rows and columns of such contact areas, or contact areas of different shapes and sizes, or a random pattern of such contact areas. In each case, each contact surface area of the mold plate should be separated from the others by channeling means.

THE THERMOFORMABLE MATERIALS

The materials which may be employed as the blanks in the present invention are normally solid thermoformable materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks are preferably used in the form of sheet. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and from 0 to about 50 mol per cent of one or more non-vinyl monomers which are interpolymerizable with vinyl monomers. The term "vinyl monomer" means a compound which contains at least one polymerizable group of the formula

Such vinyl monomers, therefore, would include the following: unsubstituted olefins, including monoolefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrollidone, ethyl methylene malonate, acrolein, vinyl alcohol, vinyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadieneacrylonitrile terpolymers, ethylene-vinyl-acetate copolymers, ethylene-acrylic acid copolymers, ethyleneacrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styreneacrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium, aluminum, barium, zinc, zirconium, beryllium, iron, nickel, cobalt, and the like.

The polymers from which the blanks are shaped may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount", that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the process of the present invention, it is possible that blanks of the present invention can also be made wherein a low melting metal, or alloy or compound thereof, can be used as the blank with mold plates made from non-fusible materials, or materials having fusion points than such low metallic materials.

Some rigid polymeric materials such as polysulfone resins, polycarbonate resin, and certain vinyl resins such as polyvinyl chloride, tend to develop internal stresses and associated frozen-in-strains when press formed into blanks. When such stresses and strains are present, it is not possible to readily use the blanks in the process of the present invention unless the blanks are first annealed to relax such stresses and strains in the blank. This annealing can be accomplished in about the blank. This annealing can be accomplished in about 0.5 to 240 minutes at temperatures ranging from the heat distortion temperature to the melting point of the resin as disclosed in U.S. patent application Ser. No. 213,432, now abandoned filed Dec. 29, 1971 in the names of Walter H. Smarook and John Sonia.

Where the compositions used for the thermoformable blank contain fillers, the expansion temperature may have to be increased 5° to 20°C. to compensate for the increased viscosity of the resulting compositions.

THE MOLD PLATES

The two mold plates used to pull the blank apart can be made of the same or different materials. The mold plates may have continuous or channeled surfaces, as noted above, they may also be porous or non-porous. A porous top mold plate may be used for venting purposes when the channeling means is a negative type channeling means. The channels may be straight or arcuate, and in a pattern or labyrinthian.

During the molding operation it is desirable as noted above, to vent the interior portions of the blanks which are being pulled apart. The need for venting the blanks expanded, as noted above, arises due to the fact that a vacuum is created within the interior sections of the blank by virtue of the increase of the volume or such interior portions during the expansion operation. If the blank is not vented during the expansion operation, atmospheric pressure could cause puncture of the extended rib sections of the expanded blank during the expansion operation. This venting of the expanded blank can be accomplished by using channeled or porous mold plates.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile, wallboard and concrete; and proteinaceous materials such as leather and hides.

Fusible materials having a relatively high Tg or Tm which could be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride; or fusible materials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates after the expansion operation, when the cooled expanded blank would not otherwise readily separate from the mold plates.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferably where the mold plates are to be channeled or porous, so as to effect the venting therethrough.

The following examples are merely illustrative of the present invention and are not intended as a limitation upon the scope thereof.

The press used in these examples was a spring loaded Carver press, as shown in FIGS. 2 to 4 of the drawings. Two springs were used in the press and each had a deflection of 130 pounds per inch, and the springs were designed to mechanically pull the platens apart, as explained above with reference to FIGS. 2 to 4, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 5A and 5B electrically. Top mold plate 1 was made of aluminum. The temperature of the surface of both the heated platens and the mold plates were measured with a thermocoupled pyrometer.

EXAMPLES 1-8

Eight blanks, in the form of 6 × 6 inches plaques, of eight different thermoplastic materials were expanded as disclosed above with respect to FIGS. 1 to 4, inclusive, to produce expanded objects as disclosed in FIGS. 5–7. The blanks were of various initial thickness, and they were expanded to various heights. Table I below lists:

a. the polymeric material used in each plaque;
b. the Ta of each such polymeric material, in °C.;

c. the initial thickness, in mils, of the plaque when it was inserted in the press;
d. the temperature of the platens and upper mold plate when the plaque was inserted in the press;
e. the temperature of the platens, upper mold plate, and plaque at the start of the expansion step in the process;
f. the final thickness of the expanded blank, in mils;
g. comments on the flexibility or rigidity, and on the clarity or color of the resulting expanded blank.

During the expansion process the blanks were expanded at the rate of about 15–20 mils per second.

height of 300 mils to produce a unitary rigid expanded article 17 as shown in FIG. 10.

The amount of pressure used to pull the plates of the press apart in the process of the present invention is about 1 to 10 pounds per square inch of continuous surface area on the blank contact surface of the plates.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which

TABLE I

| Example | Polymer | Ta-°C. | Initial Thickness mils | Insertion Temp. °C. | Expansion Temp. °C. | Expanded Thickness mils | Comments |
|---|---|---|---|---|---|---|---|
| 1 | polycarbonate | 320 | 80 | 280 | 270 | 240 | rigid, black |
| 2 | 94.2/5.7 ethylene-ethyl acrylate copolymer | 110 | 60 | 140 | 130 | 240 | very flexible, clear |
| 3 | polymethylmeth-acrylate | 160 | 120 | 180 | 180 | 630 | rigid, clear |
| 4 | thermoplastic polyurethane polyester | 160–180 | 100 | 170 | 160 | 310 | very flexible, somewhat opaque, yellow |
| 5 | Nylon-6 | 240 | 65 | 250 | 240 | 325 | moderately flexible, relatively opaque |
| 6 | polystyrene | 185 | 60 | 190 | 185 | 240 | rigid - clear |
| 7 | (rigid) poly-vinyl chloride | 155 | 130 | 205 | 195 | 650 | rigid, clear, yellow |
| 8 | polyethylene; 0.96 density 4 melt index | 135–140 | 60 | 160 | 150 | 300 | rigid - clear |

NOTES:
1. The polymeric material used in Example 1 was General Electric Co's. Lexan polycarbonate which was filled with 4% by weight of carbon black.
2. The plaque of polyvinyl chloride used in Example 7 was annealed at 150°C. for 5 minutes prior to be inserted in the press, to remove stresses therein.

EXAMPLE 9

This example discloses the preparation of an expanded article 12 as shown in FIG. 9. The expanded article was prepared from a 60 mil thick sheet of impact grade polystyrene which had a Ta of 180°C. The expanded article was prepared from four strips of the polystyrene, each of which were ⅜ inch wide and 3 inches long. The strips were then placed on the lower platen 5B of the Carver press so as to form a hollow square measuring 3⅜ inches on each of the four sides thereof. During the step in the process as shown in FIG. 3 where the top mold plate 1 and lower platen 5B are brought together to fuse and slightly compress the blank, the four strips of polystyrene were fused togther at the four seams 12B, by dotted lines or arrows in FIG. 9. The polystyrene strips were inserted in the press when it was heated to 210°C., and the fused square of polystyrene strips was then expanded at 200°C. to a height of 300 mils to product a unitary rigid expanded article 12 as shown in FIG. 9.

EXAMPLE 10

This example discloses the preparation of an expanded article 17 as shown in FIG. 10. The expanded article was prepared from a 60 mil thick sheet of impact grade polystyrene which had a Ta of 180°C. The expanded article was prepared from a hollow circular blank which was punched out of a continuous sheet of the polymer so as to provide a ring shaped blank having an inner diameter of one 1⅞ inches. The continuous solid portion of the ring thus had a width of 7/16 inch. This punched out ring shaped blank was then inserted in the press at 210°C. and expanded at 200°C. to a are more susceptible to this type of moisture absorption are the polycarbonate resins, polymethymethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other then through the venting means. The difference between the level of ambient pressure and the level of reduced pressure existing under the partial vacuum conditions in the void areas is sufficient, in the absence of such venting, to rupture the relatively thin walls of expand thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°C below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures at which the related thermoformable material could be used in the process of the present invention. The reported Ta values were found, initially, by a trial-and-error technique in which a heated sheet of the thermoformable material (6 inches × 6 inches × 100 mils) was placed between continuous sheets of aluminum (6 inches × 6 inches × 100 mils) so as to ascertain, empirically, by trial-and-error, the minimum temperature at which the process of the present invention could be conducted. The reported Ta value was thus the minimum temperature at which the thermoformable material would adhere to the sheet of aluminum with sufficient force so that mechanical work applied to the molten thermoformable material, in the form of the pulling of the two sheets of aluminum apart, produced a viscous flow in the thermoformable material without loss of adhesion to the aluminum plates, as the plates were pulled apart to a height of at least 12 times its original thickness.

These same minimum Ta values, as determined with aluminum mold plates, were also found to be the same (within about ± 1°–2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ± 1°–2°C. of the minimum Ta values which had been previously found for such material in the initial trial-and-error procedures. These minimum Ta values were also within about ± 1°–2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as the viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. A process for integrally forming a bristled article from a blank of thermoformable material having a Ta in the form of a sheet having a top surface and a bottom surface which comprises inserting said blank between a top mold plate and a bottom mold plate, each of said mold plates having a surface for contacting the top and bottom surfaces of said blank, and each of said mold plates having a fusion point which is higher than the Ta of said thermoformable material, the blank contacting surface of said bottom mold plate being continuous, and the blank contacting surface of said top mold plate having a pattern of channel means therein, said channel means being used to provide a pattern of channels at the interface between the top surface of said blank and the blank contact surface of the top mold plate, such blank contact surface of the top mold plate, such pattern providing areas of contact between the top surface of the blank and the blank contact surface of the top mold plate at the non-channeled areas of said top mold plate, and such pattern also providing areas of non-contact between the top surface of the blank and the blank contact surface of the top mold plate at the channeled areas of said top mold plate, heating said blank to at least its Ta so as to adhesively bond said blank by hot tack adhesion to the blank contacting surfaces of said mold plates, pulling said mold plates apart while said blank is thus adhesively bonded thereto so as to draw a portion of the thermoformable material from the blank in the form of a plurality of discrete bristle elements, the pattern of occurrence of said bristle elements being determined by the pattern of areas of contact between the top mold plate and the blank, said pulling apart effecting partial vacuum conditions between said bristle elements, venting said channels during said pulling apart so as to equilibrate the lower level of pressure within said channels with the higher level of ambient pressure without said channels so as to thereby regulate the uniformity and integrity of the configuration of the bristles, cooling the resultant expanded blank to a temperature below the heat distortion temperature of said thermoformable material, and separating the cooled expanded blank from said mold plates.

2. A process as in claim 1 in which said channels are arranged in a grid pattern.

3. A process as in claim 2 in which the blank contacting areas on the blank contacting surface of said top mold plate are angular.

4. A process as in claim 3 in which the blank contacting areas on the blank contacting surface of said top mold plate are rectangular.

5. A process as in claim 1 in which the two mold plates are pulled apart so as to provide bristle elements of uniforms height.

6. A process as in claim 1 in which the blank contains internal stresses and is annealed to remove said stresses therefrom prior to expanding the blank.

7. A process as in claim 1 in which said channel means comprise recessed channels.

8. A process as in claim 7 in which said recessed channels are interconnected.

9. A process as in claim 8 in which said recessed channels are arranged in a grid pattern.

10. A process as in claim 9 in which the blank contacting areas on the blank contacting surface of said top mold plate are angular.

11. A process as in claim 10 in which the blank contacting areas on the blank contacting surface of said top mold plate are rectangular.

* * * * *

UNITED STATES PATENT OFFICE
CERTIFICATE OF CORRECTION

Patent No. 3,919,378          Dated November 11, 1975

Inventor(s) Walter H. Smarook          Page 1 of 2

It is certified that error appears in the above-identified patent and that said Letters Patent are hereby corrected as shown below:

Column 3, in the Table, "10." should be aligned with "polypropylene".

Column 5, line 21, "extend" should read --extent--.

Column 11, line 43, "cradles" should read --cradled--.

Column 12, line 25, "polymethymethacrylate" should read --polymethylmethacrylate--.

Column 14, line 52, "acids" should read --aids--.

Column 15, line 19, "having" should read --having higher--.

Column 15, line 19 "low" should read --low melting--.

Column 15, line 29 should be deleted.

Column 15, line 55, "or" should read --of--.

Column 16, line 60, "6 x" should read --6 inches x--.

Column 17, line 49, "togther" should read --together--.

Column 17, line 54, "product" should read --produce--.

Column 17, line 65, "one" should be deleted.

UNITED STATES PATENT OFFICE
CERTIFICATE OF CORRECTION

Patent No. 3,919,378　　　　　　　Dated November 11, 1975

Inventor(s) Walter H. Smarook　　　Page 2 of 2

It is certified that error appears in the above-identified patent and that said Letters Patent are hereby corrected as shown below:

Column 18, In Table I, Note 2, "be" should read --being--.

Column 18, line 35, "polymethymethacrylate" should read --polymethylmethacrylate--.

Column 18, line 52, "voids" should read --void--.

Column 20, line 29, "material" should read --materials--.

Column 22, line 39, "uniforms" should read --uniform--.

Signed and Sealed this

Twentieth Day of July 1976

[SEAL]

Attest:

RUTH C. MASON
*Attesting Officer*

C. MARSHALL DANN
*Commissioner of Patents and Trademarks*